Oct. 2, 1962 G. F. QUAYLE 3,056,461
POWER STEERING FOR INDUSTRIAL TRUCK
Filed Oct. 11, 1960 2 Sheets-Sheet 1
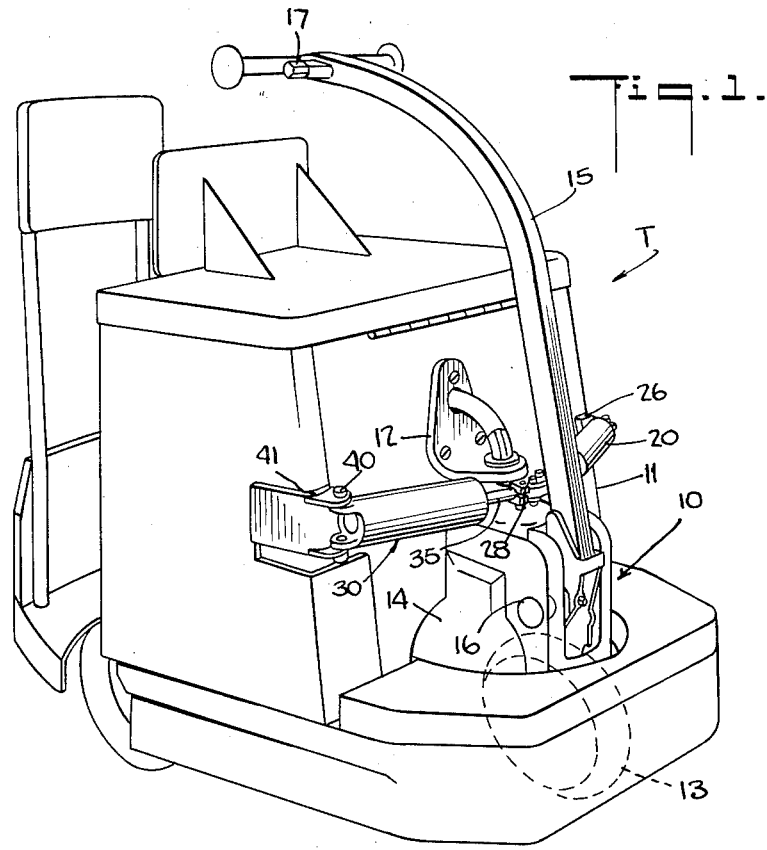
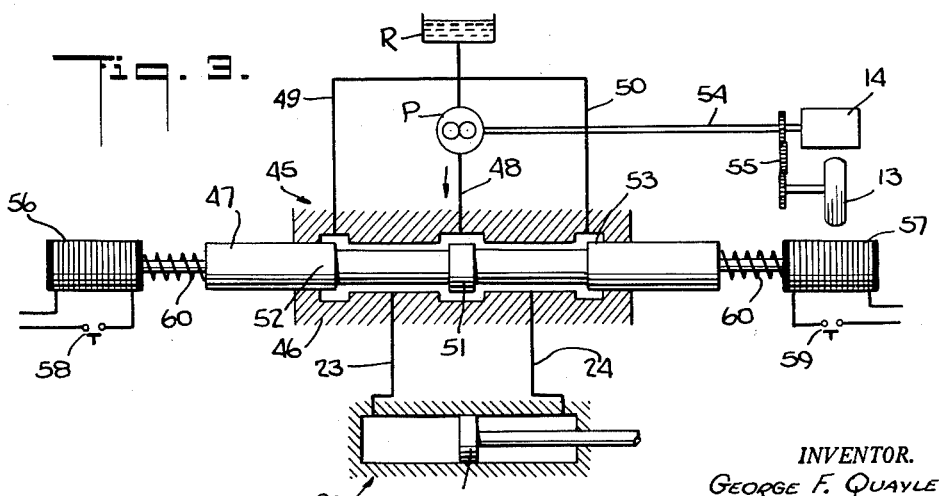
INVENTOR.
GEORGE F. QUAYLE
BY
A. H. Golden
ATTORNEY

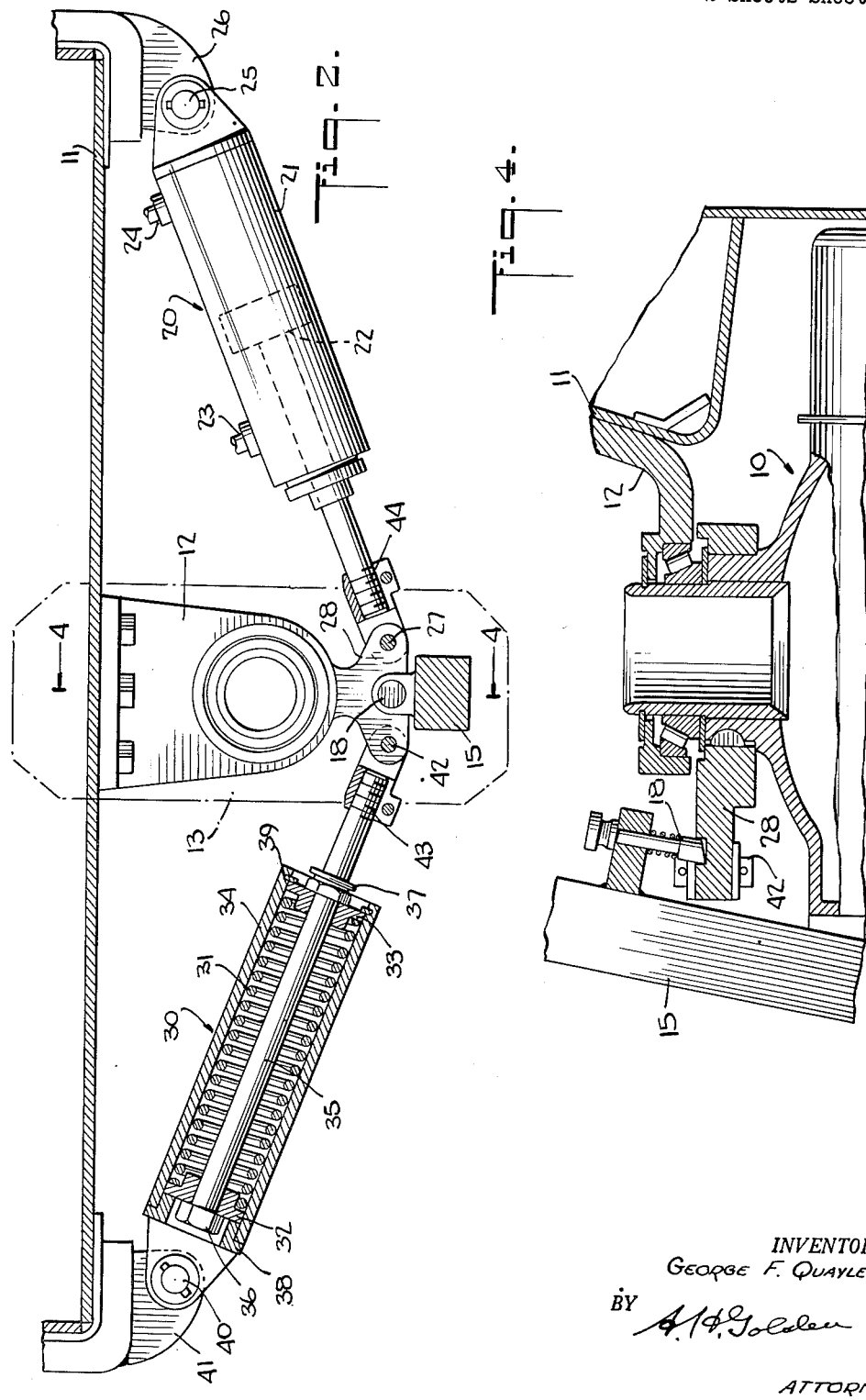

3,056,461
POWER STEERING FOR INDUSTRIAL TRUCK
George F. Quayle, Philadelphia, Pa., assignor to The Yale and Towne Manufacturing Company, Stamford, Conn., a corporation of Connecticut
Filed Oct. 11, 1960, Ser. No. 61,936
7 Claims. (Cl. 180—52)

This invention relates to power steering for an industrial truck.

In steering mechanisms of the particular class, it is customary to use power means that will first steer a wheel, and then hold the wheel in the position to which it is steered. Thus, for example, a conventional mechanism may have a hydraulic ram and a valve that will direct fluid pressure to the ram whereby to steer the wheel. Upon steering the wheel, the valve will so control the fluid relatively to the ram so as to hold the wheel in the particular steering position. The steering mechanisms that operate in that way are rather effective and are in wide use. However, the novel power steering that I have conceived by my invention distinguishes in important respects over the earlier mechanisms of that kind, and has certain advantages when utilized on an industrial truck.

As an important feature of my invention, I utilize power means that are adapted to apply power to steer a wheel on an industrial truck, but that also will leave the wheel free for steering movement independently of the power. Together with the power means, I utilize yielding means that are connected to the wheel for steering the wheel. Thus, the power means will at times control the steered wheel, while the steering at other times will be controlled through the yielding means.

In the form of my novel steering mechanism that I prefer, there is a hydraulic ram which is connected to a steering arm on the wheel. There also is a spring which yieldingly resists movement of the wheel from a predetermined steering position. When fluid pressure is applied to the ram, the ram will act as the spring yields to steer the wheel away from the predetermined position, and when the ram is relieved of fluid pressure the spring will return the wheel to that position. My mechanism then will contribute a type of steering that can be used to particularly good effect in controlling the movements of an industrial truck.

Very considerable advantages are gained when the spring in my invention is arranged to hold the steered wheel in a straight forward steering position, so that the truck normally will travel in a straight path. Should the truck happen to deviate from its path, the steering can be corrected merely through the application of a simple power impulse to the power means or ram. The duration of the power impulse will determine the angle of steering, and when the impulse ceases the spring will return the wheel to straight forward position. A relatively long power impulse naturally can be used to steer the truck at a sharp angle, when that is desired.

The novel concept of my invention enables me to utilize steering controls that are quite simple. Thus, it is merely necessary to use means that will direct fluid pressure impulses to a hydraulic ram, while controlling the duration of each pressure impulse to determine the angle of steer. A hydraulic valve that has merely two or three operating positions will suffice for that purpose. A valve of that kind is particularly suited for operation by means that respond to simple electrical signals. Thus, my novel steering mechanism actually is very well adapted to form a part of a remote or automated control system for an industrial truck.

As a still further feature of my invention, I utilize as a source of fluid pressure for the steering ram, a pump that is driven by the traction motor of the industrial truck. The arrangement is such that the fluid pressure and volume output of the pump is proportional to the driving of the truck. Through that arrangement, the rapidity of the steering movement will depend upon the speed of the truck. It will be appreciated that this feature will contribute better steering control, whether the controls are manual or automated.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

FIG. 1 shows an industrial truck that utilizes my novel power steering mechanism.

FIG. 2 shows a plan view of my mechanism with parts of the truck.

FIG. 3 shows diagrammatically the power actuation of my mechanism.

FIG. 4 shows a section on the line 4—4 in FIG. 2.

For the purpose of describing my invention, I have chosen to show in FIG. 1 an industrial truck T of the type that has a steering and traction unit 10 mounted for steering rotation on the truck frame 11. The details of the steering and traction unit 10 are not important to an understanding of my invention, but I may indicate that unit 10 has an upper end mounted for steering rotation on a bracket 12 on frame 11, and is equipped with a traction wheel 13, shown in dotted lines in FIG. 1, which is driven by a motor 14 on the unit. The construction that I show includes a control handle 15 mounted on the steering and traction unit 10 through a pivot 16, and equipped with power controls 17 for the traction motor 14, as is conventional. The steering handle 15 may be used by a person walking ahead of the truck or riding upon the truck, should that be desired, in the manner which is well described in the patent to Ulinski, No. 2,913,062. It will be appreciated, of course, that handle 15 will not be used to steer the truck when the steering mechanism of my invention is in operation, the handle then being held in a rearward position by suitable means such as a latch 18 that I show in FIG. 4.

I shall now proceed to describe the novel power steering mechanism of my invention.

If we refer again to FIG. 1, and in more detail to FIG. 2, we see that I utilize in my preferred construction a hydraulic ram 20 having a cylinder 21 and a ram piston 22 that moves in the cylinder. The ram 20 actually is a conventional type of ram, with passages 23, 24 that will allow fluid to flow relatively to each end of the piston 22. As is well shown in FIG. 2, the ram cylinder 21 is connected to the truck frame 11 through a pivot 25 on a bracket 26, while the piston 22 is connected through a pivot 27 to a steering arm 28 that rotates integrally with the steering and traction unit 10. Those connections are such that the ram piston 22 will be in a medial position in cylinder 21 when the steering wheel 13 is in a straight forward steering position.

I utilize further a spring assembly 30 of a conventional double acting type, including a coil spring 31 that acts at its opposed ends against spring collars 32, 33, each of which can slide relatively to one end of spring casing 34. A rod 35 is slidable in a longitudinal direction in openings of each of the collars 32, 33, and is equipped with a head 36 and a flange 37 that will enable a longitudinal movement of rod 35 to slide one or the other of collars 32, 33, so as to compress spring 31. The collar that is not moved will be held relatively to casing 34 by a stop member 38 or 39 on the casing. As will be understood, the rod 35 can be moved in either direction through sliding of a collar 32 or 33 so as to compress the spring 31. However, spring 31 normally will hold rod 35 in a predetermined position, with collars 32, 33 against their stops 38, 39.

The spring casing 34 is pivoted at 40 to a bracket 41 on truck frame 11, and the rod 35 is connected by a pivot 42 to steering arm 28, so that the spring pressure of assembly 30 normally will hold the steering wheel 13 in its straight forward steering position. I prefer to equip the rod 35 with a threaded connection 43 which will enable spring assembly 30 to be adjusted, should that be necessary in order to place wheel 13 exactly in the proper position. I also show ram piston 22 equipped with a threaded connection 44 that may be used should it be desired to adjust the position of piston 22 relatively to wheel 13.

From the description that I have thus far made, it will be understood that spring assembly 30 normally will be effective to hold wheel 13 in position to steer truck T in a straight fore and aft direction. Then, by an application of fluid pressure to either of the passages 23, 24 on ram 20, the truck will be steered in one direction or the other through yielding of the spring assembly 30.

If we refer now to FIG. 3 of the drawings, in which I indicate diagrammatically the hydraulic system of my steering mechanism, we see that the passages 23, 24 actually comprise lines that extend to a valve 45. I show housing 46 of valve 45 equipped with a spool valve member 47 so shaped that the member when in a medial position will allow fluid to flow freely along the interior of housing 46. The passages or lines 23, 24 then are in full communication with one another, as I shall presently discuss in more detail. As a source of fluid pressure, I show a pump P that directs fluid pressure through a line 48 to valve housing 46 at a point that is intermediate lines 23, 24. Lines 49, 50 connect opposed end portions of housing 46 to the low pressure side of pump P, and a reservoir R may be connected to those lines to supply make-up fluid.

Thus, with valve member 47 in its medial position, it will be appreciated that there is in effect an open fluid circuit enabling fluid to flow freely through pump P and valve 45, and applying no effective pressure through lines 23, 24 to ram 20. However, when valve member 47 is moved in one direction or the other, relatively large medial and end portions 51, 52, 53 on that member will coact with inner portions of housing 46, whereby to control the flow of the fluid. For example, should valve member 47 move to the right, as viewed in FIG. 3, the valve portion 51 acts to direct the pressure flow from line 48 through line 23 to one end of ram 20. At the same time, medial portion 51 cuts off the high pressure from line 24, while that line remains open to low pressure line 50 or, in effect, to the atmosphere through reservoir R.

Thus, when valve member 47 is moved to the right, the fluid pressure from pump P will move the ram piston 22 so as to steer wheel 13 in one direction away from its straight forward position. Now, should valve member 47 be returned to its normal medial position, lines 23, 24 will again be open, in effect, allowing fluid to flow freely relatively to opposed ends of ram piston 22. Spring assembly 30 then will be effective to return wheel 13 to normal position. Should valve member 47 be moved to the left, the steering operation naturally will be the same as I have described, but in the opposed direction relatively to straight forward position.

I now call attention to the fact that I utilize the traction motor 14 to drive the pump P, that being done through a driving connection 54 that I show diagrammatically in FIG. 3. Since motor 14 also drives traction wheel 13, as through gears 55 shown in FIG. 3, the pump P and wheel 13 actually are driven in common, so that the fluid output of pump P will have a predetermined relation to the speed of wheel 13. That will cause the ram 20, when steering wheel 13, to act with a rapidity that is proportional to the truck speed. Thereby I facilitate to a considerable extent the steering of the truck in a particular path, when taking into account the fact that the truck may move at different speeds.

Those persons skilled in the art will be able to arrange means for actuating the valve 45 in my invention, but I do prefer to utilize a pair of solenoid coils 56, 57, FIG. 3, that are arranged in coacting relation to opposed ends of member 47. Each coil 56, 57 can be energized through the closing of a switch 58 or 59, and then will move valve member 47 to one of its opposed positions to effect steering of wheel 13 in a corresponding direction. Spring means 60 may be utilized to move valve member 47 to its neutral position when each coil 56, 57 is de-energized. It is possible to use the relatively simple means I have described for actuating the valve 45, because of the fact that valve member 47 need merely have three operating positions to contribute effective steering. That is, a neutral position that enables spring assembly 30 to control the steering, and two opposed positions that will effect hydraulic power steering in one direction or the other.

It may be well now to review the operation of my novel power steering mechanism. First, let us assume that the valve member 47 is in its neutral position, as shown in FIG. 3. The hydraulic lines 23, 24 are then open, in effect, allowing a free flow of fluid relatively to both ends of the ram piston 22, so that piston 22 will move freely and will not control the steering. The spring assembly 30 now is in control and will hold the wheel 13 in its straight forward steering position, so that the truck normally will move in a straight path.

If we now assume that the truck for some reason drifts to one side of a straight path, it will be possible to correct the steering by closing momentarily the proper switch 58 or 59. That will actuate the valve member 47 so as to deliver a fluid pressure impulse to the ram 20, steering the wheel. Ram 20 naturally is relieved of fluid pressure when the impulse ends, since spring 60 then returns valve member 47 to neutral position. That enables spring assembly 30 to steer the wheel 13 to its straight forward position and to hold it in that position.

Should it be necessary to steer the truck at a considerable angle, the switch 58 or 59 need merely be held closed for a longer time. That will cause valve 45 to apply a longer pressure impulse to ram 20, so that the ram will steer wheel 13 through a sharper angle. When the pressure impulse is terminated through opening of the particular switch, spring assembly 30 again will steer wheel 13 to its straight forward position.

Regardless of the angle through which ram 20 steers wheel 13, the rapidity of the steering will be proportional to the truck speed, due to the proportional output of pump P. That enables me to achieve a more consistent steering pattern and contributes better steering control, whether the truck moves at a low or a relatively high speed.

Of course, it will be appreciated that my novel power steering mechanism will allow manual steering, when that is desired. That is because the power ram 20 normally is free from hydraulic pressure, allowing the truck to be steered merely upon yielding of the spring assembly 30. Thus, a person riding upon or walking ahead of the truck T still can use the steering handle 15 to steer the truck, as in the Ulinski patent to which I referred earlier.

I believe that the construction and operation of my novel power steering mechanism will now be understood, and that the advantages of my invention will be fully appreciated. My novel concept not only contributes very effective steering of an industrial truck, but also enables very simple controls to be used for that purpose. Those controls need merely apply power impulses to effect the steering, and may very well be actuated through means that are responsive to simple electrical signals, should that be desired. I believe, therefore, that the very considerable merits of my invention will be appreciated by those persons skilled in the art.

I now claim:

1. In a truck of the class described, a steered wheel, a steering arm secured to said wheel for steering said wheel, a hydraulic ram connected to said steering arm, normally open passages permitting a substantially free flow of hydraulic fluid relative to the ram so that said ram does not oppose a steering movement of the wheel, yielding means acting relatively to the wheel for holding said wheel in a particular position, a traction motor, means through which the traction motor drives said wheel to move the truck at a speed proportional to the speed of the motor, a pump driven by said traction motor so that the fluid volume and pressure of said pump is proportional to the speed of the truck, and means for applying the fluid pressure of said pump to said ram to actuate said ram and steering arm, so as to steer the wheel through yielding of said yielding means, with the speed of steering dependent upon the truck speed.

2. In a truck of the class described, a steered wheel, a steering arms secured to said wheel for steering said wheel, a spring, means whereby said spring yieldingly resists movement of said steered wheel in either of opposed directions from a straight forward position, a hydraulic ram, a traction motor, means through which the traction motor drives the truck at a speed that is proportional to the speed of the motor, a pump driven by said traction motor when said motor is actuated to drive said truck so that the fluid volume and pressure of said pump is proportional to the speed of movement of the truck, means whereby the application of the fluid pressure to said ram actuates said steering arm to steer said wheel in either of opposed directions, and said spring returning said steering wheel to straight forward position when said ram is relieved of fluid pressure.

3. In a truck of the class described, a steered wheel, a steering arm secured to said wheel for steering said wheel, a spring, means whereby the pressure of said spring yieldingly resists movement of said steered wheel in either of opposed directions from a straight forward position, a hydraulic ram connected to said steering arm, hydraulic lines through which fluid flows relatively to each end of the ram, valve means controlling said lines and normally in position allowing a substantially free flow of hydraulic fluid through said lines so that said ram does not oppose a steering movement of the wheel, a traction motor, means through which the traction motor drives the truck at a speed proportional to the speed of the motor, a pump connected to said valve means and driven by said traction motor so as to deliver fluid to said valve means at a volume and pressure proportional to the speed of the truck, a portion of the valve means acting when said valve means are moved from their normal position to direct the fluid pressure to one or the other end of said ram, whereby to actuate said ram and steering arm to steer the wheel in either of opposed directions at a speed dependent upon the speed of the truck, and said spring returning said steering wheel to straight forward position due to the free flow of fluid through said hydraulic lines when said valve means are in normal position.

4. In a truck of the class described, a truck frame, a wheel mounted for steering movement on the truck frame, the steering movement of said wheel being opposed by forces acting through contact between the wheel and the ground, a steering arm secured to said wheel, a spring assembly adapted to yield in opposed directions relatively to a normal position, means connecting said spring assembly between the truck frame and the steering arm to hold the wheel normally in a straight forward steering position, a hydraulic ram connected between said frame and steering arm, and means for applying fluid pressure to one or the other end of said ram whereby to steer the wheel in either direction against the pressure of said spring assembly, and said spring assembly being equipped with a spring acting with a force greater in effect than the forces acting between the wheel and ground, so as to return the wheel to straight forward position when the ram is relieved of fluid pressure.

5. In a truck of the class described having a ground engaging wheel that rotates on a steering mounting to steer the truck, the steering rotation being opposed by forces acting through contact between the wheel and ground, relatively strong spring means acting with sufficient force between the truck and the steering mounting to rotate the wheel while the rotation is opposed by the forces that act between the wheel and ground, stop means limiting the action of the spring means so that said spring means normally hold the wheel in a predetermined steering position, a hydraulic ram mounted to act between the truck and the steering mounting for rotating the wheel, means for applying fluid pressure to said ram whereby to steer said wheel against the spring pressure relatively to its predetermined position, and said spring means being effective to rotate the wheel to steer the truck when the ram is relieved of fluid pressure.

6. In a truck of the class described having a traction wheel in tractive engagement with the ground and rotating on a steering mounting to steer the truck, a traction motor driving said traction wheel to move the truck, the steering rotation of the traction wheel being opposed by forces acting through contact between the traction wheel and ground, relatively strong spring means acting with sufficient force between the truck and the steering mounting to rotate the traction wheel on its steering mounting while the rotation is opposed by the forces that act between the wheel and ground, stop means limiting the action of the spring means so that said spring means normally hold the traction wheel in a predetermined steering position, a hydraulic ram mounted to act between the truck and the steering mounting for rotating the wheel, means for applying fluid pressure to said ram whereby to steer said wheel against the spring pressure relatively to its predetermined position, and said spring means being effective to rotate the traction wheel to steer the truck when the ram is relieved of fluid pressure.

7. In a truck of the class described having a series of ground engaging wheels at least one of which is a steered wheel rotating on a steering mounting to steer the truck, a traction motor, means through which the traction motor drives a wheel of said series of wheels to move the truck at a speed proportional to the speed of the motor, the steering rotation of the steered wheel being opposed by forces acting through contact between that wheel and ground, relatively strong spring means acting with sufficient force between the truck and the steering mounting to rotate the steered wheel while the rotation is opposed by the forces that act between the wheel and ground, stop means limiting the action of the spring means so that said spring means normally hold the steered wheel in a predetermined steering position, a hydraulic ram mounted to act between the truck and the steering mounting for rotating the steered wheel to steer said wheel against the spring pressure relatively to its predetermined position, a fluid pump driven by the traction motor, means for applying fluid pressure from said pump to the ram whereby to steer the steered wheel at a rate proportional to the speed at which the traction motor drives the truck, and said spring means being effective to steer the truck when the ram is relieved of fluid pressure.

References Cited in the file of this patent

UNITED STATES PATENTS

| | | |
|---|---|---|
| 2,424,288 | Severy | July 22, 1947 |
| 2,613,888 | Stratford | Oct. 14, 1952 |
| 2,621,002 | Pittman | Dec. 9, 1952 |
| 2,624,533 | Brader | Jan. 6, 1953 |
| 2,755,778 | Loofbourrow et al. | July 24, 1956 |
| 2,768,699 | Gardner et al. | Oct. 30, 1956 |
| 2,783,849 | Armington et al. | Mar. 5, 1957 |
| 2,958,481 | Price | Nov. 1, 1960 |